Nov. 5, 1968    L. SCHOMANN    3,409,715
METHOD OF CASTING WORKPIECES FROM CASTING RESIN
Filed Oct. 21, 1965    3 Sheets-Sheet 1

INVENTOR:
Leonid Schomann
BY
Darbo, Robertson & Vandenbergh.
Attys.

Nov. 5, 1968  L. SCHOMANN  3,409,715
METHOD OF CASTING WORKPIECES FROM CASTING RESIN
Filed Oct. 21, 1965  3 Sheets-Sheet 2

INVENTOR:
Leonid Schomann
BY
Darby, Robertson & Vanderburgh,
Attys.

Nov. 5, 1968  L. SCHOMANN  3,409,715
METHOD OF CASTING WORKPIECES FROM CASTING RESIN
Filed Oct. 21, 1965  3 Sheets-Sheet 3

INVENTOR:
Leonid Schomann
BY
Darby, Robertson & Vandenburgh,
Attys.

United States Patent Office 3,409,715
Patented Nov. 5, 1968

3,409,715
METHOD OF CASTING WORKPIECES FROM CASTING RESIN
Leonid Schomann, Wuppertal-Barmen, Germany, assignor of one-half interest to Alfred Eckerfeld, Langenberg/Rhineland, Bokenbusch, Germany
Filed Oct. 21, 1965, Ser. No. 499,297
Claims priority, application Germany, Dec. 30, 1964,
E 28,444
1 Claim. (Cl. 264—250)

ABSTRACT OF THE DISCLOSURE

A method of forming a closed body for an electric water heater having an elongated circuitous passageway wherein a core corresponding in configuration to the passageway is positioned in a first female mold and supported by pins projecting from the sides and bottom of the mold. Epoxy resin is poured into the mold and around the core until it overflows. The resin is cured and the resultant work part is removed from the female mold having an open channel recess formed from the core part and transverse openings formed from the pins. The open channel recess is subsequently closed by inverting the workpart into a shallow second female mold that has been filled with uncured epoxy resin. The resin is cured and the closed body is removed.

---

The present invention relates to a method of casting workpieces formed with cavities from casting resin, preferably epoxy resin, for instance, for casting channel bodies or containers of electric water heaters. Workpieces are known to be cast from casting resin, having open recesses from which a core is removable. If, however, in a workpiece a closed cavity is required which cannot be readily formed by a removable core, it was hitherto necessary to provide a second part such as a cover or cover plate to be screwed on the workpiece or otherwise connected therewith. This will generally result in large area sealing surfaces which have to be worked, and in a considerable manufacturing display as regards the connection means. It is therefore the object of the present invention to avoid the expense connected with the sealing and attachment of a second part by providing a suitable casting method.

The method according to the invention consists in that first a work part formed with an open recess corresponding to the configuration of the cavity is cast in a mold, that such work part after setting thereof is then placed with downwardly facing opening of the recess on a second mold in spaced relationship to the bottom thereof, so that the top rim of the second mold protrudes slightly upwardly only beyond the plane of the recess opening and that the second mold is filled with casting resin up to the brim and the work part thereby has joined thereto as by casting a complementary part complementing with a plane surface thereof formed by the liquid level of the casting resin poured into the second mold the recess to form a closed cavity, the liquid casting resin of the second mold, when setting, sealingly binding with the casting resin already set of the first work part. In this manner the opening of a recess may be closed as by casting, the fact being utilized that the liquid level in the second mold is limited in its height by the rim thereof.

It has shown that epoxy resin is particularly suited for the method according to the invention. Expediently, a thermosetting casting resin is selected. In this manner, heat-resistant containers and complicated channel bodies for electric hot water heaters can be made rather cheaply, it being essential that the epoxy casting resin has no detrimental effect on the taste of the water to be heated.

It has shown to be advantageous to first fill pot- or cup-shaped molds open at the top thereof with liquid casting resin and by subsequent insertion of core parts and mounting of the set work part, respectively, to cause overflow as by displacement. Residual gas and air in the liquid casting resin will then escape from a large surface so that a workpiece free of shrink holes can be cast without vacuum treatment.

Figure 1:
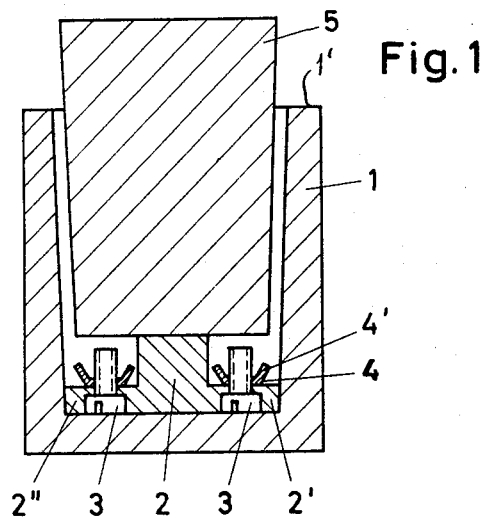
Figure 2:
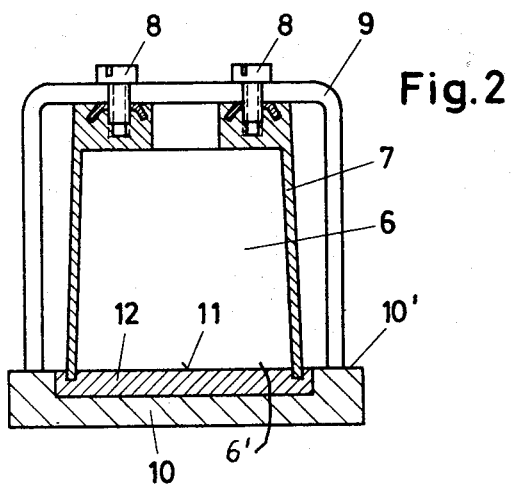

The present invention will be discussed hereinafter by means of a few embodiments, reference being had to the diagrammatic illustrations 1 to 7, wherein FIG. 1 and FIG. 2 illustrate the casting of a water tank for hot water heaters.

Figure 3:
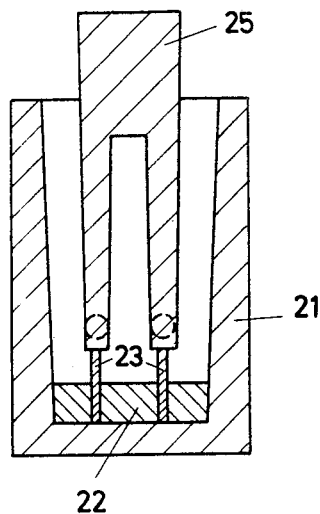
Figure 4:
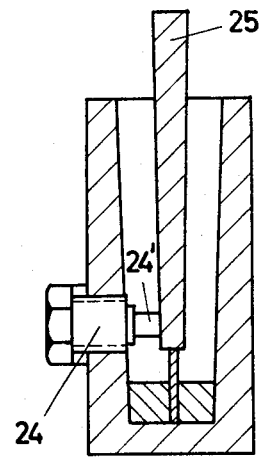
Figure 5:
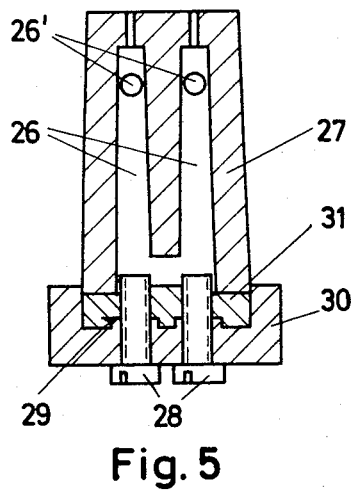

FIG. 3 to FIG. 5 demonstrate the casting process of a channel body for electric continuous-flow heaters.

Figure 6:
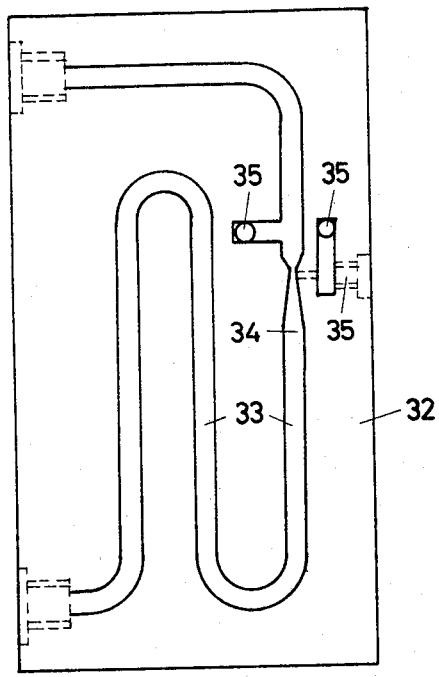
Figure 7:
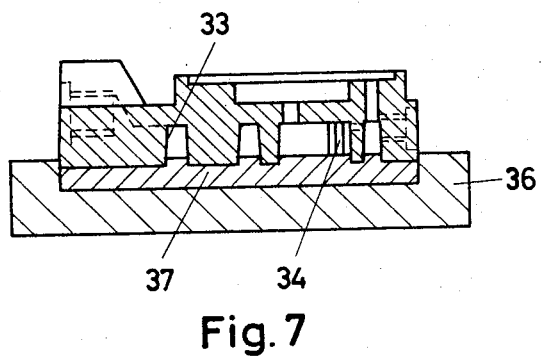

FIG. 6 and FIG. 7 illustrate the casting process with an alternate block-type channel body for electric continuous-flow heaters.

With reference to FIG. 1 there is shown a cup-shaped mold 1 having supported on the bottom thereof an insertable core 2. Into flange-like bosses 2', 2" of core 2 there are screwed from below screws 3 having mounted thereon threaded nuts 4 provided with upwardly bent tongues 4'. The mold 1 is then partially filled up with liquid epoxy resin above core 2 so that the shafts of the screws 3 protruding from core 2 and the threaded nuts 4 with the tongues 4' thereof are surrounded by liquid epoxy resin. From the free surface of the filled-in epoxy resin residual gas and air are free to escape so that no air bubbles are trapped anymore. Then, mold 1 has inserted therein a core part 5 of slightly conical shape engaging core 2 and being carried thereby. The liquid epoxy resin displaced by core part 5 overflows the top rim 1' of mold 1 and may be removed. The mold will then be heated in a furnace up to from 284 to 356° F. so that the liquid epoxy resin will set. After removal from the mold and withdrawal of cores 2, 3, 5 made possible in well-known manner by the application of a parting compound, a work part 7 (compare FIG. 2) is obtained having a cast-in screw threads and threaded nuts, formed with a still open recess 6 corresponding to the configuration of the cavity. As is shown in FIG. 2, the work part 7 with downwardly facing opening 6' of recess 6 is secured as by screws 8 on a bracket type mounting 9. Mounting 9 is placed on the rim 10' of a second mold 10 filled prior thereto with liquid epoxy resin. The mounting 9 is dimensioned such that the edges of work part 7 defining opening 6' submerge only little into the liquid level 11 of the epoxy resin contained in mold 10. The entire assembly is then again heated in a furnace so that the epoxy resin contained in mold 10 will set. Thereby, opening 6' of work part 7 is closed as by casting by a complementary part 12 which, when setting, enters into intimate and tight connection with the edges of the previously set work part 7.

In the embodiment as illustrated in FIG. 3 to FIG. 5 making of a channel block is involved the interconnected channels of which shall later accommodate heating coils for heating water flowing therethrough. A mold 21 having arranged therein a core 22 provided with protruding pins 23 and having laterally screwed thereinto screws 24 with pin projections 24', has inserted therein a bifurcated core part 25, whereby mold 21 filled with epoxy resin is caused to overflow. After setting of the epoxy resin effected in the furnace a work part 27 having still open channel recesses 26 carried therethrough and being formed with transverse channels 26' will be obtained having connected thereto as by casting in the manner described in a second mold 30 a complementary part 31 closing off the channel recesses 26. Into the second mold 30 there are screwed screws 28 acting as threaded cores so that the finished complementary part 31 will be provided with cast-in threaded bores. On the external surface thereof the complementary part 31 may be provided with annular depressions 29 or other profiling, if the second mold 30 is designed accordingly.

In FIG. 6 there is shown a cast work part 32 being adapted to form a flat disk-shaped body and formed on both sides thereof with open recesses produced by removable cores. The work part 32 has been cast from epoxy resin in a manner as hereinbefore described in a first mold (not shown) and hardened in the furnace. The channels cast-in on one side face of work part 32 as open grooves 33 with a Venturi-shaped restricted portion 34 shall constitute in connection with cast-in connecting channels 35 a closed continuous-flow path for the water to be heated. As previously described, a complementary part 37 in form of a side wall closing off the grooves 33 is joined as by casting to the flat work part 32 in a second mold 36. The contact faces between work part 7, 27 and 32, respectively, and the complementary parts 12, 31 and 37 joined thereto as by casting must be cleaned from parting compound prior to the second casting process to ensure tight connection of the complementary parts when setting. It is advantageous to have the contact face of work parts 7, 27, 32 surface ground shortly by a face plate, thereby to remove the parting compound.

The invention is claimed as follows:

1. The method of forming a closed body for an electric water heater having an elongated circuitous passageway extending therethrough with external openings at the ends of the passageway, said body having at least six sides with said openings extending through at least one of said sides, said method comprising the steps of:

forming a first female mold having internal walls conforming in spacial relationship to that of five of said sides, one of which is said one side;

forming a core corresponding in configuration to said passageway with projections therefrom corresponding in size and position to the size and position of said openings;

supporting said core in said mold with the projections bearing against the corresponding portions of the mold walls to function at least a part as the support for the core and with the core otherwise spaced from the walls;

applying a parting compound to said walls and core;

filling the space between the core and the walls with an uncured epoxy resin to a level below the top of the core;

curing said epoxy resin to form the major component of the body;

removing said core including said projections to leave said passageway exposed on a first side of said component with said openings spaced from said component first side;

forming a second female mold with a cavity having a bottom corresponding to the sixth side and lips extending upwardly a short distance from said bottom;

filling said second mold with an uncured epoxy resin;

removing any parting compound from said first side of said component;

inserting said component with said first side thereof downwardly into the resin in said second mold to a level insufficient to cover said openings and fill said passageway;

curing said resin in said second mold; and removing the body from the second mold.

References Cited

UNITED STATES PATENTS 2,945,266 7/1960 Mainardi _____ 264—268 X
3,120,572 2/1964 Shannon _____ 264—261
3,194,867 7/1965 Shannon _____ 264—250 X ROBERT F. WHITE, *Primary Examiner.*

K. J. HOVET, *Assistant Examiner.*